United States Patent
Ham

(12) 
(10) Patent No.: US 7,264,375 B1
(45) Date of Patent: Sep. 4, 2007

(54) SELF-BALLASTED FLUORESCENT LAMP

(76) Inventor: Byung Il Ham, 8 Calle Viento, Rancho Pales Verdes, CA (US) 90275

( * ) Notice: Subject to any disclaimer, the term of this patent is extended or adjusted under 35 U.S.C. 154(b) by 0 days.

(21) Appl. No.: 11/368,209

(22) Filed: Mar. 3, 2006

(51) Int. Cl.
*F21Y 103/02* (2006.01)

(52) U.S. Cl. ...................................... 362/260; 362/216
(58) Field of Classification Search ................ 362/260, 362/216, 221, 217, 363
See application file for complete search history.

(56) References Cited

U.S. PATENT DOCUMENTS 3,742,208 A * 6/1973 Mills ........................... 362/216
4,161,020 A * 7/1979 Miller ......................... 362/216
2003/0223230 A1* 12/2003 Li ............................... 362/216

* cited by examiner

*Primary Examiner*—Laura Tso

(57) ABSTRACT

A fluorescent lamp unit employing a fluorescent tube having a double spiral configuration is provided. The fluorescent lamp unit include a double spiral configured fluorescent tube having an upper central portion from which two spiral portions extend at a downward incline and wind around a vertical axis such that an outer diameter of the double spiral configuration increases as the spiral portions extends from the upper central portion to sealed ends of the fluorescent tube. The fluorescent lamp unit further includes a ballast housing having an electronic ballast contained therein. The ballast housing is partially enclosed by the spiral portions of the fluorescent tube.

23 Claims, 10 Drawing Sheets

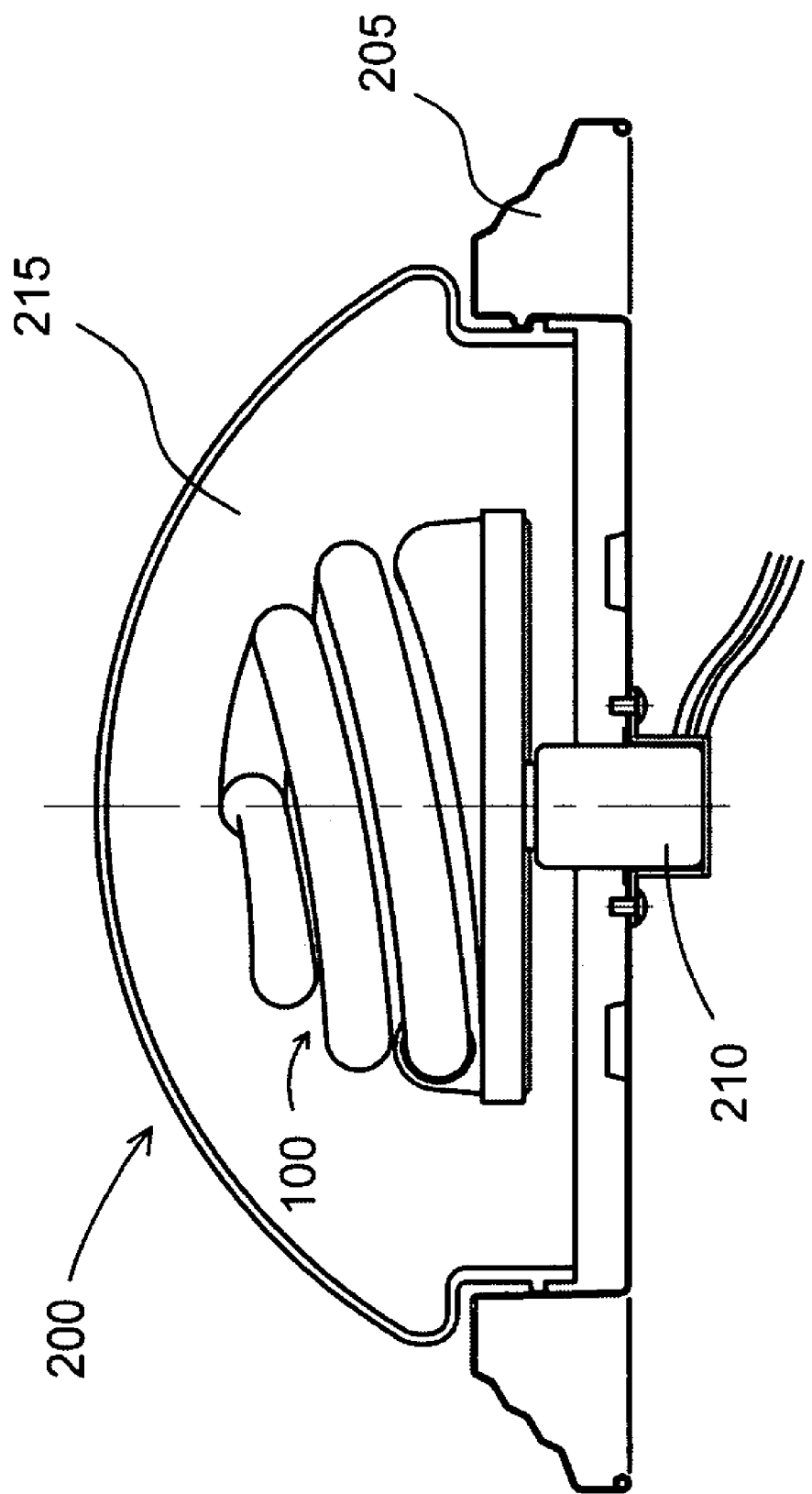

SELF-BALLASTED FLUORESCENT LAMP

BACKGROUND OF THE INVENTION

1. Field of the Invention

The present invention generally relates to fluorescent lamps, and in particular, to self-ballasted fluorescent lamps.

2. Description of the Related Art

Fluorescent lamps provide a number of advantages over incandescent lamps. For one thing, fluorescent lamps consume much less energy (e.g., only one-quarter to one-third of the energy) than incandescent lamps to produce the same amount of light. Plus, fluorescent lamps have much longer service lives than incandescent lamps (e.g., 10 to 15 times longer).

Referring to FIGS. 10 through 15, various conventional fluorescent lamps for use with a ceiling mounted lighting fixture are shown. The ceiling mounted lighting fixture 400 generally includes a fixture base 405 and an electronic ballast 410 mounted thereto. The ceiling mounted lighting fixture 400 may further include a cover 425 removably attached to the fixture base 405. The cover 425 has a circular shape and provides a limited height clearance in the region where a lamp unit is to be mounted. As a result, a conventional compact fluorescent lamp 490 (shown in FIG. 14) may not be suitable for use with such lighting fixtures, as illustrated in FIG. 15. One type of conventional fluorescent lamp for use with the ceiling mounted lighting fixture 400 is a circular fluorescent lamp tube 415 which is retained within the fixture base 405 by a number of resilient lamp holders 420. Another type of lamp unit currently used with the ceiling mounted lighting fixture 400 is illustrated in FIGS. 12 and 13, which employs two fluorescent lamps 450-1 and 450-2, each lamp having twin U-shaped lamp tubes or quad-straight lamp tubes.

There are a number of disadvantages associated with the above-mentioned conventional fluorescent lamps 415, 450 and 490 for use with the ceiling mounted lighting fixture 400. For example, the circular fluorescent lamp tube 415 shown in FIGS. 10 and 11 may not provide evenly distributed lighting over the light fixture cover 425, possibly causing dim center region to appear on the cover 425 where the illumination is weak. Similarly, the two fluorescent lamp unit configuration shown in FIGS. 12 and 13 may also cause dim regions to appear on the cover 425 since illumination is provided only in the areas proximal to the lamp units 450-1 and 450-2. Another disadvantage associated with the conventional fluorescent ceiling lighting system, illustrated in FIGS. 10 through 13, is that because the electronic ballast is housed within a separate ballast housing unit 410, the ballast unit 410 must be replaced separately from the fluorescent lamp, increasing the cost and effort associated with maintaining the ceiling lighting system.

BRIEF SUMMARY OF EMBODIMENTS THE INVENTION

Described herein are various embodiments of a fluorescent lamp unit employing a fluorescent tube formed in a double spiral configuration. The double spiral configured fluorescent tube has an upper central portion from which two spiral portions extend at a downward incline and wind around a central vertical axis such that an outer diameter of the double spiral configured tube increases as the spiral portions extends from the upper central portion to sealed ends of the fluorescent tube. The fluorescent lamp unit further includes a ballast housing having an electronic ballast contained therein. The ballast housing is partially enclosed by the spiral portions of the fluorescent tube.

In one aspect of one embodiment, the ballast housing has a cylindrical configuration defined by an upper wall and side walls. In one embodiment, the ballast housing extends vertically into a partially enclosed space region defined by the spiral portions of the fluorescent tube such that at least an upper half of the ballast housing is surrounded by the spiral portions of the fluorescent tube. In one embodiment, a downward inclination angle of the spiral portions of the fluorescent tube in a vicinity of the sealed ends is less than 25 degrees with respect to a horizontal axis. In another characterization of one embodiment, the ballast housing extends vertically into a partially enclosed space region defined by the spiral portions of the fluorescent tube such that the upper wall of the ballast housing is disposed at an elevation above the sealed ends of the fluorescent tubes.

In another aspect of one embodiment, the fluorescent lamp unit further comprises a support member. The support member includes a first tube holder section to receive one of the sealed ends of the fluorescent tube, and a second tube holder section to receive another of the sealed ends of the fluorescent tube. In one embodiment, the first tube holder section and the second tube holder section are separated by a distance which is greater than the diameter of the ballast housing, and the ballast housing is positioned between the first tube holder section and the second tube holder section. In one embodiment, the support member further includes a circular base structure having an upper plane section and a lower plane section, which are disposed in spaced-apart relationship with respect to each other to form a chamber between the upper and lower plane sections. The first tube holder section, the second tube holder section and the ballast housing are disposed on the upper plane section of the circular base structure. Extending downward from the lower planar section of base section is a neck section to which an electrically conductive base is non-detachably attached. In one embodiment, the conductive base attached to the lamp unit is a standard Edison-type screw-in type conductive base ($^{34}/_{32}$ inch medium screw base) to screw into a standard Edison-type lamp socket. In an alternative embodiment, the conductive base attached to the lamp unit is a $^{21}/_{32}$ inch intermediate screw base.

In another characterization of one embodiment, a fluorescent lamp unit for use with a ceiling mounted lighting fixture is provided. The fluorescent lamp unit preferably employs a fluorescent tube having a length greater than 60 centimeters, which is shaped (e.g., by bending the glass tube) into a defined configuration such that an overall outer diameter of the shaped fluorescent tube is in a range from 9 centimeters to 12 centimeters. In one embodiment, an overall vertical height of the lamp unit including the ballast housing, the fluorescent tube and the screw-in type base is less than 7 centimeters to enable the lamp unit to be mounted within a ceiling lighting fixture having a limited height clearance. The shaped fluorescent tube is configured such that when the lamp unit is used with a ceiling lighting fixture having a cover, the lamp unit is operable to provide evenly distributed lighting over the lighting fixture cover.

As described above, the fluorescent tube is shaped into a double spiral configuration defined by two spiral portions extending from a central point at a downward incline and winding around a central vertical axis such that the outer diameter of the double spiral configured tube increases as the spiral portions extends from the upper central point to sealed ends of the fluorescent tube. Because the outer diameter of the double spiral configured tube increases as the spiral portions extends from the upper central point to sealed ends of the fluorescent tube, vertical overlapping of spiral portions is reduced by the lamp tube configuration constructed in accordance with one embodiment of the present invention. As such, the fluorescent lamp unit in accordance with one embodiment may be capable of more effectively distributing light evenly over the cover of a light fixture than conventional compact fluorescent lamps. Additionally, the reduction in vertical overlapping of spiral portions of the double spiral configured fluorescent tube, in accordance with one embodiment of the present invention, may help more effectively dissipate heat generated by the fluorescent tube than conventional compact fluorescent lamps.

BRIEF DESCRIPTION OF THE DRAWINGS

Embodiments of the invention are illustrated by way of example and not by way of limitation in the figures of the accompanying drawings in which like references indicate similar elements. It should be noted that the references to "an embodiment" or "one embodiment" of this disclosure are not necessarily to the same embodiment, and such references mean at least one.

FIG. 7A is an elevational view, partly in cross-section, of the fluorescent lamp unit received in the socket of the lighting fixture of FIG. 6.

DETAILED DESCRIPTION OF THE INVENTION

In the following description, specific details are set forth in order to provide a thorough understanding of various embodiments of the present invention. However, it will be apparent to one skilled in the art that embodiments of the present invention may be practiced without these specific details. In other instances, well-known hardware components, structures and techniques have not been shown in detail in order to avoid obscuring embodiments of the present invention. It should be noted that, as used in the description herein and the claims, the meaning of "in" includes "in" and "on".

Figure 3:
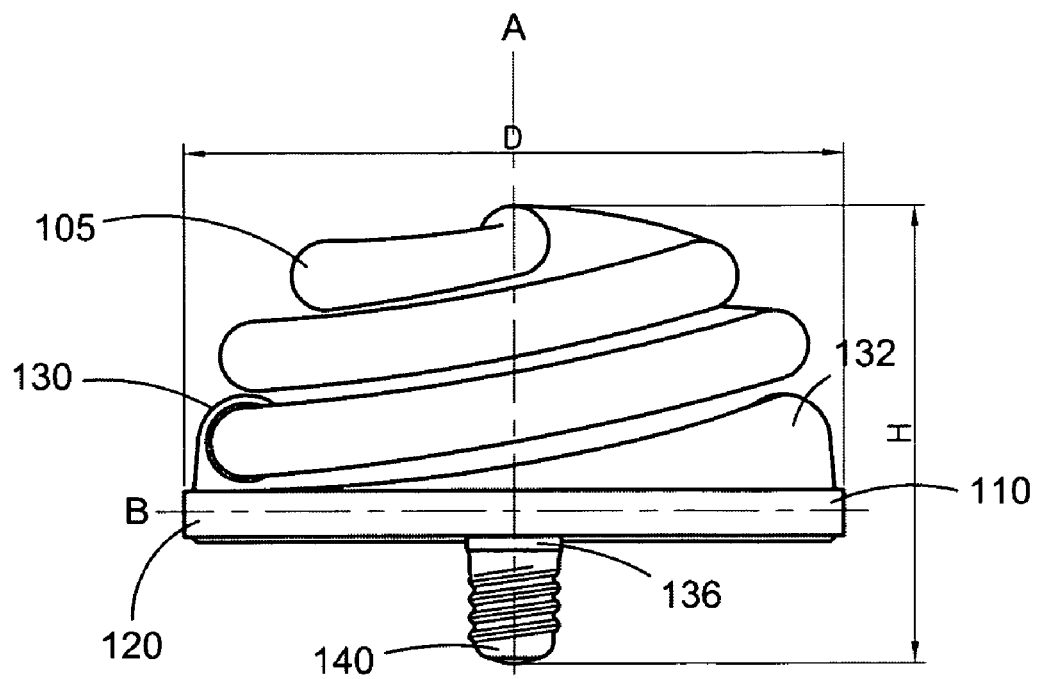
FIG. 3 is an elevational view of the fluorescent lamp unit of FIG. 1.
Figure 4:
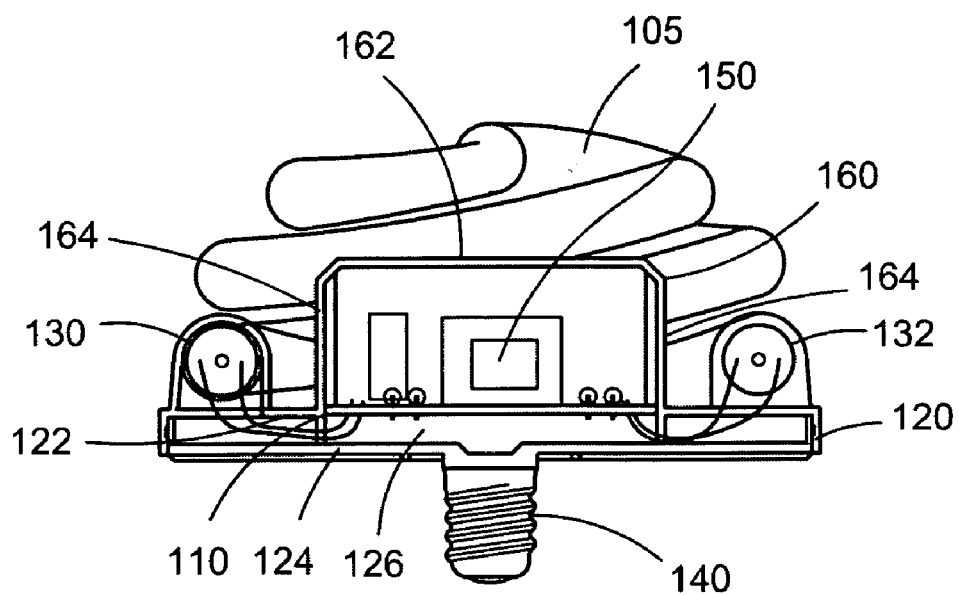
FIG. 4 is an elevational view, partly in cross-section, of the fluorescent lamp unit of FIG. 1.
Figure 5:
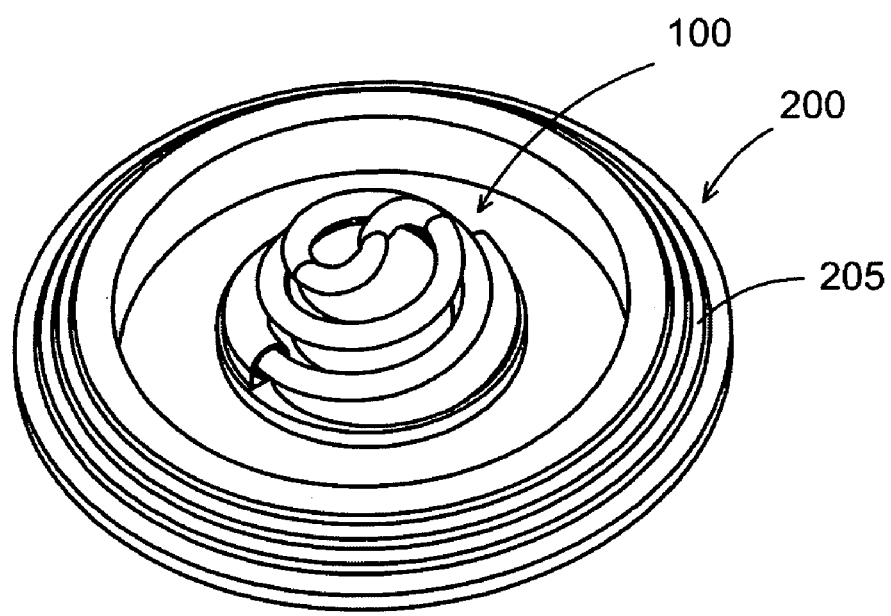
FIG. 5 is a diagrammatic perspective view of the fluorescent lamp unit of FIG. 1 received in a socket of a ceiling mountable lighting fixture.
Figure 6:
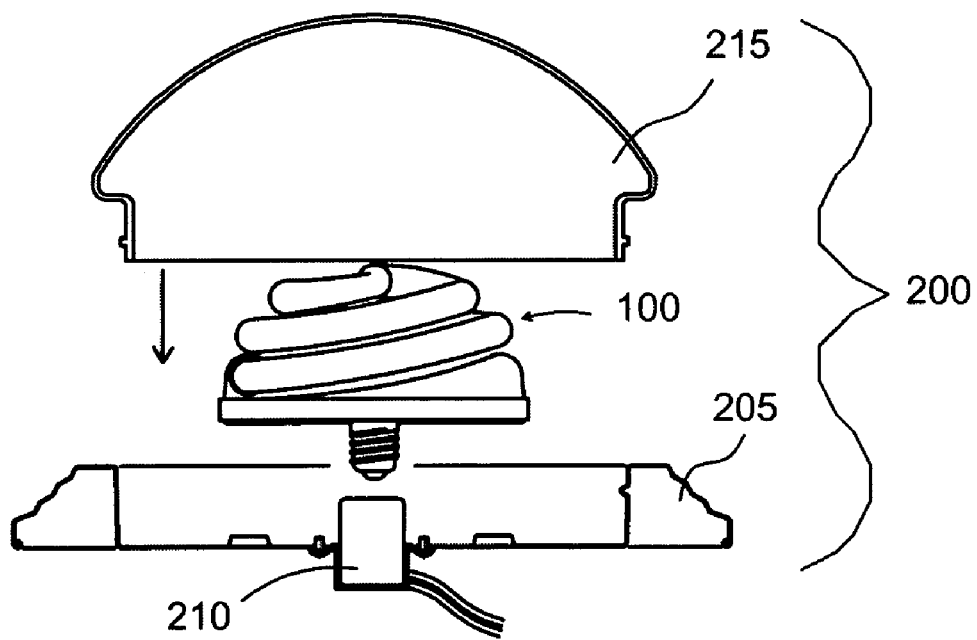
FIG. 6 is an exploded elevational view, partly in cross-section, of the fluorescent lamp unit of FIG. 1 and a ceiling mountable lighting fixture.
Figure 15:
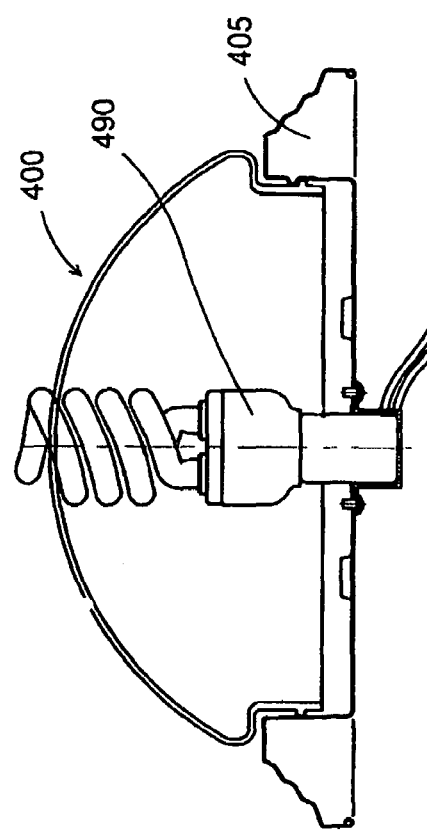
FIG. 15 is an elevational view, partly in cross-section, of the conventional compact fluorescent lamp unit of FIG. 14 received in a socket of a ceiling mountable lighting fixture.

FIGS. 1 through 4 depict a fluorescent lamp unit 100 according to one embodiment of the invention. Also depicted in FIGS. 5 through 7 is an example of a lighting fixture 200 with which the fluorescent lamp unit 100 may be used. The illustrated lighting fixture 200 may correspond to a ceiling mount type lighting fixture or a wall mount type lighting fixture. However, it is understood that the fluorescent lamp unit 100 described with reference to FIGS. 1 through 7 may also be used with other types of lighting fixtures, including floor and table lamp fixtures. The lighting fixture 200, illustrated in FIGS. 5 through 7, generally includes a fixture base 205 mountable to a ceiling or a wall of a room and a screw-in type socket 210 coupled to the fixture base 205. Removably attached to the fixture base 205 is a circular cover 215. The circular cover 215 has a slight rounded shape but may not provide sufficient height clearance to be used with a conventional compact fluorescent lamp, as illustrated in FIG. 15.

The fluorescent lamp unit 100, shown in FIGS. 1 through 4, generally includes a fluorescent lamp tube 105 and a support member 110 to support the fluorescent tube 105. The fluorescent tube 105 includes two sealed ends. Each of the sealed ends of the fluorescent tube 105 includes an electrode made of a filament coil and electrical contacts (e.g., leads) extending from the electrode.

Figure 2:
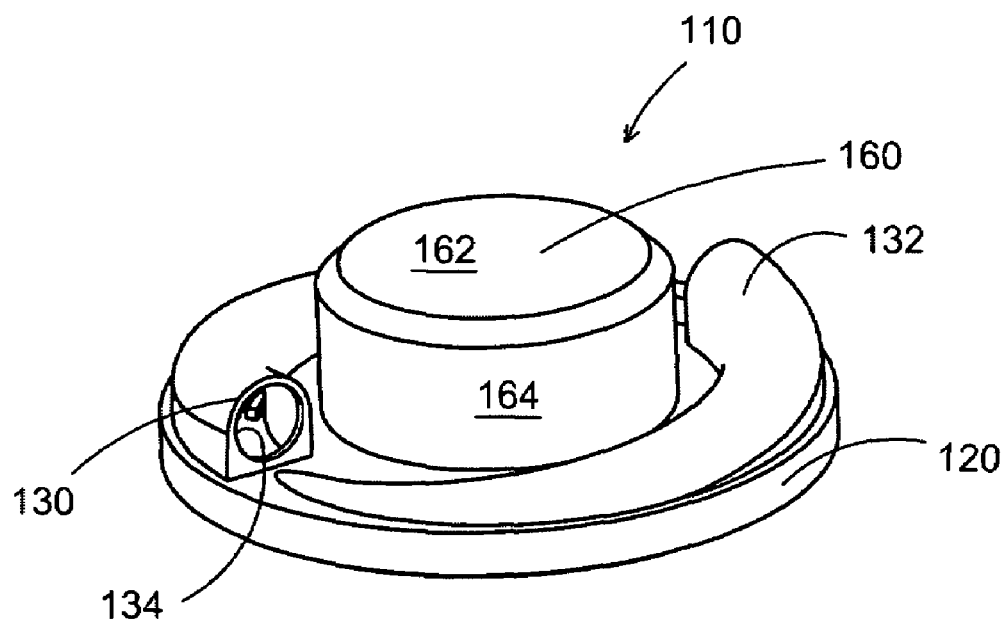
FIG. 2 is a diagrammatic perspective view of a support member of the fluorescent lamp unit of FIG. 1.

Referring to FIG. 2, one embodiment of the support member 110 for the fluorescent lamp unit 100 is shown and described. The support member 110 comprises a circular base structure 120 defined by an upper planar section 122 and a lower planar section 124 (shown in FIG. 4), which are disposed in spaced-apart relationship with respect to each other to form a chamber 126 between the planar sections 122, 124 through which conductors electrically connecting the fluorescent lamp tube 105 to the circuit assembly 150 (shown in FIG. 4) are extended. Disposed on the top surface of the upper planar section 122 are a first tube holder section 130 and a second tube holder section 132. The first tube holder section 130 has a recess 134 to receive one of the sealed ends of the fluorescent tube 105. Similarly, the second tube holder 132 has a recess (not shown) to receive the other sealed end of the fluorescent tube 105. The ends of the fluorescent tube 105 are securely attached to the tube holder sections 130, 132 by use of adhesive material or other suitable attachment means.

The support member 110 further includes a neck section 136 (shown in FIG. 3) extending from the lower planar section 124 of the base structure 120. Non-detachably attached to the neck section 136 of the support member 110 is an electrically conductive base 140. In one embodiment, the conductive base 140 is a conventional screw-in base which includes threads for threadedly engaging with an electrical lamp socket. The conductive base 140 includes at least two contact terminals positioned on the base so as to establish contact with contacts of the lamp socket when the conductive base is received in the lamp socket. In one embodiment, the conductive base 140 attached to the lamp unit 100 is a standard Edison-type screw-in type conductive base having a $^{34}/_{32}$ inch medium screw base to screw into a standard Edison-type lamp socket. In an alternative embodiment, the conductive base 140 attached to the lamp unit 100 is a $^{21}/_{32}$ inch intermediate screw base.

To drive the fluorescent tube 105, the circuit assembly 150 is coupled between the electrical contacts of the fluorescent lamp tube 105 and the contact terminals of the conductive base 140. The circuit assembly 150 comprises a number of functional elements, including an electronic ballast coupled between the fluorescent tube 105 and the conductive base 140.

Referring back to FIG. 1, the fluorescent lamp tube 105 comprises an elongated glass tube formed in a double spiral configuration. The double spiral configured tube 105 includes a central point 170 at which the glass tube is bent and two spiral portions 175, 180 extending from the central point 170. Each of the spiral portions 175, 180 are formed by winding around a central vertical axis A (shown in FIG. 3) at a downward incline such that the outer diameter of the double spiral configuration increases as the spiral portions 175, 180 extends from the top central point 170 to the sealed ends of the fluorescent tube 105. The sealed end portions of the fluorescent tube 105 are received in the tube holder sections 130,132 of the support member 110. In one embodiment, the downward inclination angle of the spiral portions of the fluorescent tube 105 is less than 25 degrees with respect to a horizontal axis B (shown in FIG. 3) proximal to the sealed ends of the fluorescent tube 105, and more preferably less than 10 degrees with respect to the horizontal axis B proximal to the sealed ends of the fluorescent tube.

Figure 1:
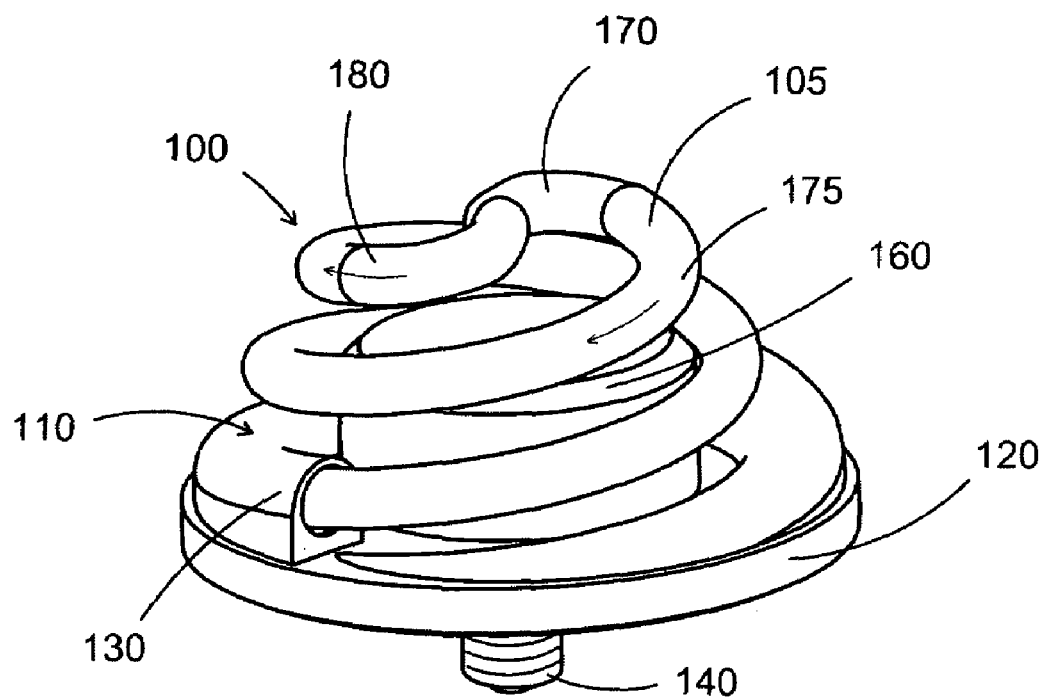
FIG. 1 is a diagrammatic perspective view of a fluorescent lamp unit according to one embodiment of the invention.

Also included in the fluorescent lamp unit 100 is a housing 160 (also referred herein as "ballast housing") to contain the circuit assembly 150. It is noted that the circuit assembly 150 of the lamp unit 100 may be partially or entirely contained in the ballast housing 160. In one embodiment, at least the electronic ballast portion of the circuit assembly 150 is contained within the housing 160. In one embodiment, the ballast housing 160 has a cylindrical configuration defined by an upper planar wall 162 and cylindrical side walls 164, as shown in FIG. 2. The ballast housing 160 is disposed on the top surface of the upper planar section 122 of the support member 110 such that at least a portion the ballast housing 160 is surrounded by the spiral portions 175, 180 of the fluorescent tube 105, as shown in FIGS. 1 and 4. In a preferred embodiment, at least an upper half of the ballast housing 160 is surrounded by the spiral portions 175, 180 of the fluorescent tube 105.

In accordance with one aspect of one embodiment, the ballast housing 160 is situated with respect to the fluorescent tube 105 such that the housing 160 does not substantially increase the overall height H (shown in FIG. 3) of the lamp unit 100. This is accomplished by placing the ballast housing 160 within a space defined by the surrounding spiral portions 175, 180 of the fluorescent tube 105.

As illustrated in FIGS. 5 through 7, the fluorescent lamp unit 100 is suitable for use with the ceiling mountable lighting fixture 200 that have a circular fixture base 205 and a limited height clearance in the region where a lamp unit is to be mounted. Accordingly, in one embodiment, the dimensions of the fluorescent lamp unit 100 are selected for use with a ceiling mountable lighting fixture such as the lighting fixture 200 illustrated in FIGS. 5 through 7. The length of the fluorescent tube 105 employed by the lamp unit 100 is preferably greater than the length of fluorescent tube employed by the conventional compact fluorescent lamp shown in FIG. 14 to increase brightness. Additionally, the overall height of the fluorescent lamp unit 100 is preferably less than the overall height of the conventional compact fluorescent lamp shown in FIG. 14 so that it can be used with lighting fixtures having a limited height clearance.

Preferred dimensions of the fluorescent lamp unit 100 are described with reference to FIG. 3. The outer diameter D of the double spiral configured fluorescent tube 105 is preferably in the range from 9 centimeters to 12 centimeters, and more preferably in the range from 10.5 centimeters to 11.5 centimeters. The overall height H of the lamp unit 100, including the support member 110 and the screw-in base 140, is preferably in the range from 5.5 centimeters to 7 centimeters, and more preferably in the range from 6 centimeters to 6.5 centimeters. The overall length of the fluorescent tube 105 (i.e., before the tube is bent into the double spiral configuration) is preferably in the range from 50 centimeters to 110 centimeters, and more preferably in the range from 60 centimeters to 92 centimeters.

Figure 7B:
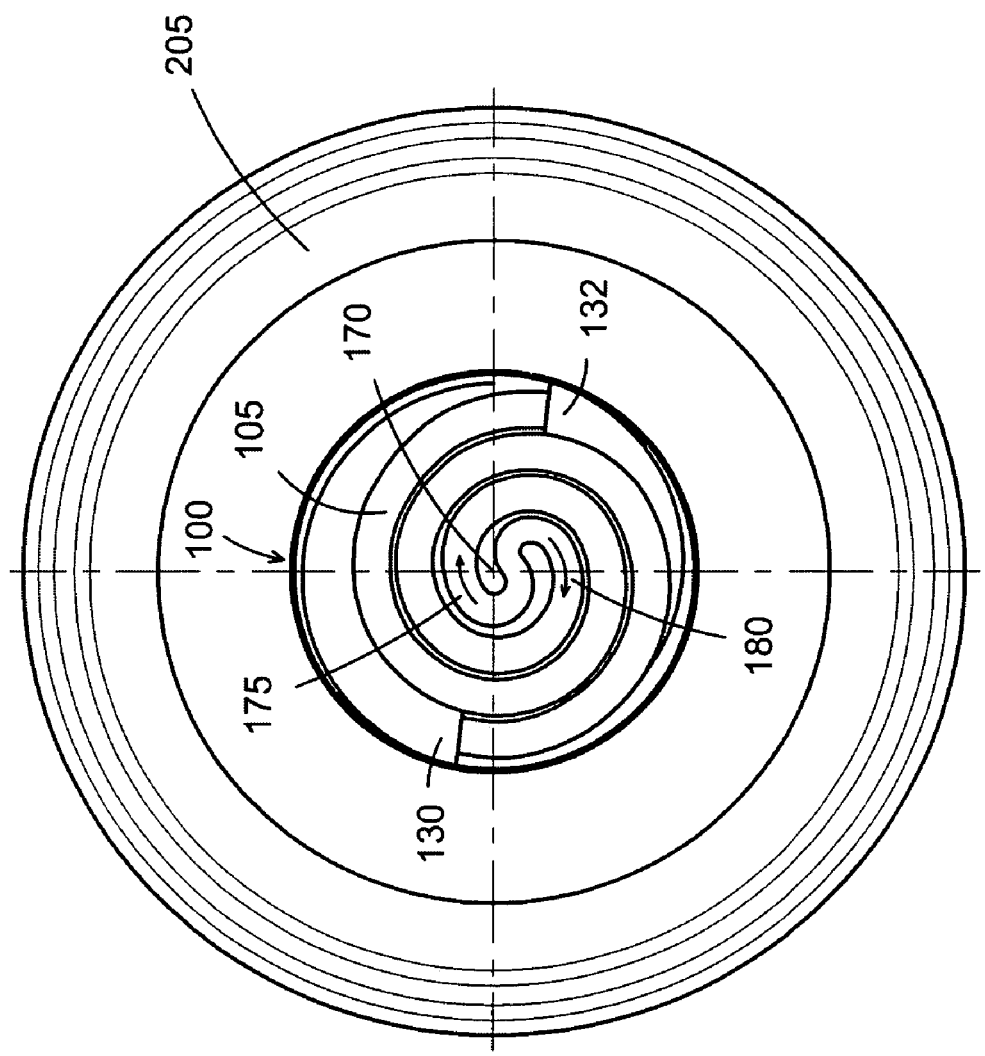
FIG. 7B is a top plan view of the fluorescent lamp unit mounted to the light fixture of FIG. 6.
Figure 8A:
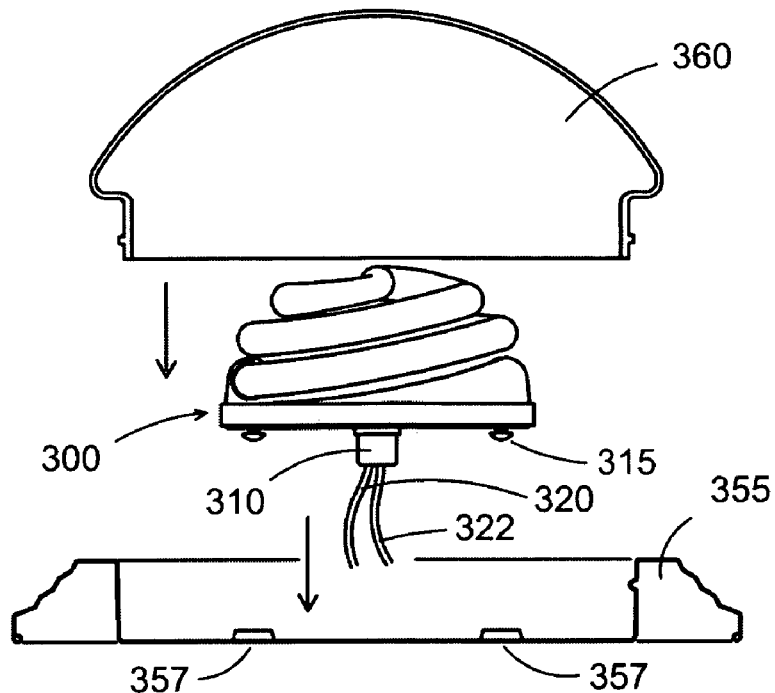
FIG. 8A is an exploded elevational view, partly in cross-section, of a fluorescent lamp unit according to another embodiment of the invention and a ceiling mountable lighting fixture for use therewith.
Figure 8B:
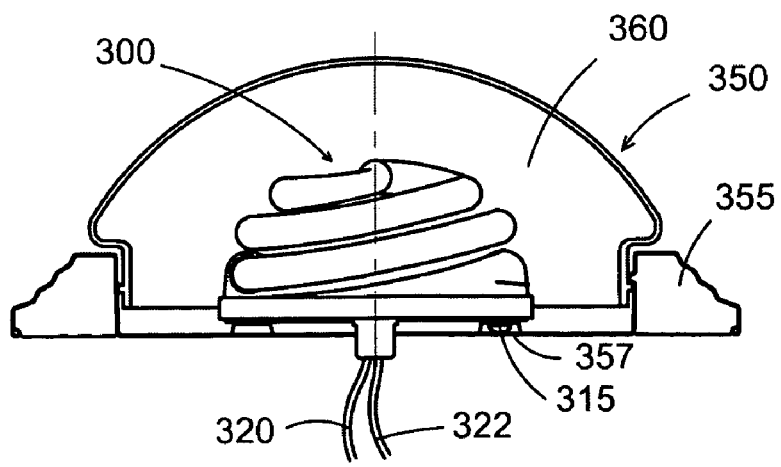
FIG. 8B is an elevational view, partly in cross-section, of the fluorescent lamp unit mounted to the ceiling mountable lighting fixture of FIG. 8A.

FIGS. 8A and 8B depict a fluorescent lamp unit 300 in accordance with another embodiment of the invention. The embodiment of the fluorescent lamp unit 300 shown and described with reference to FIGS. 8A and 8B has similar components and features as embodiments of the fluorescent lamp unit 100 shown and described with reference to FIGS. 1-7. One major distinguishable feature of the embodiment shown with respect to FIGS. 8A and 8B is that the fluorescent lamp unit 300 is not provided with a screw-in type conductive base. Instead, the fluorescent lamp unit 300 includes a base 310 having wires 320 extending from the base to connect directly with power supply wiring disposed in a ceiling or a wall of a room. Also illustrated in FIGS. 8A and 8B is a lighting fixture 350 for use with the fluorescent lamp unit 300. The illustrated lighting fixture 350 generally includes a fixture base 355 mountable to a ceiling or a wall of a room and fastener receiving mechanisms 357 coupled to the fixture base 355 for receiving the fasteners 315 of the lamp unit 300. Removably attachable to the fixture base 355 is a circular cover 360.

Figure 9A:
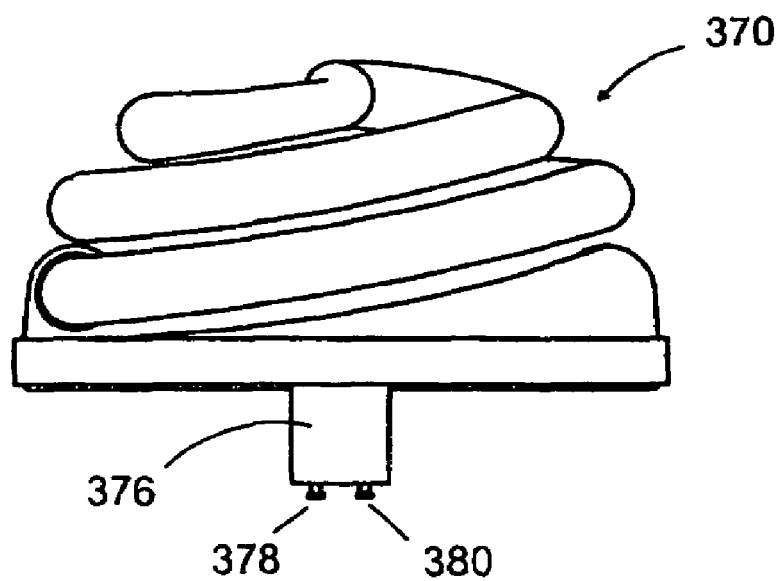
FIG. 9A is an elevational view of a fluorescent lamp unit according to another embodiment of the invention.
Figure 9B:
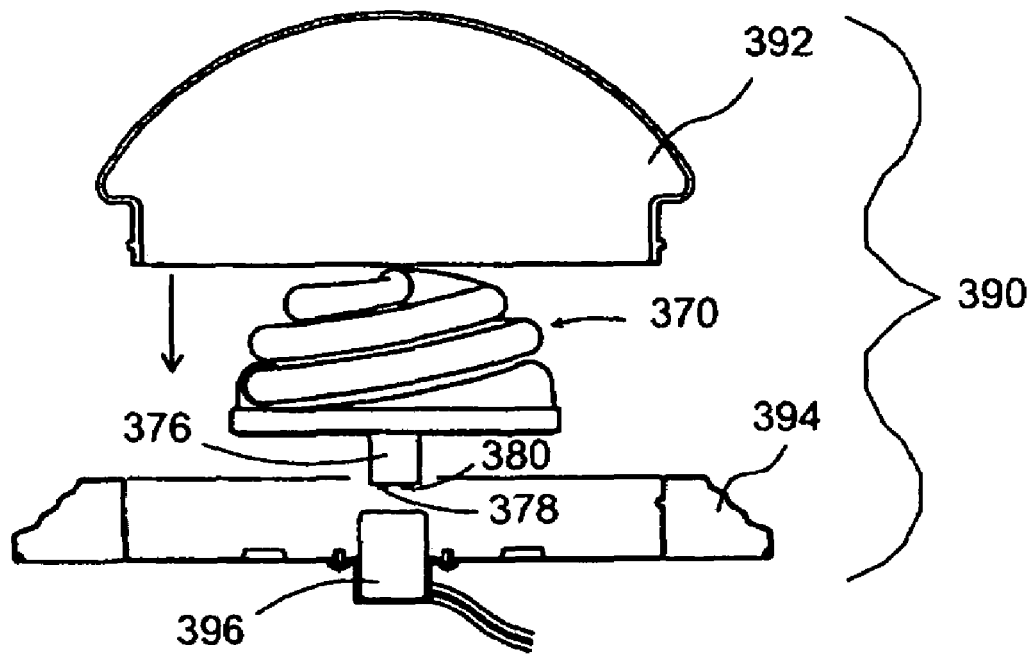
FIG. 9B is an exploded elevational view, partly in cross-section, of the fluorescent lamp unit of FIG. 9A and a ceiling mountable lighting fixture for use therewith.
Figure 10:
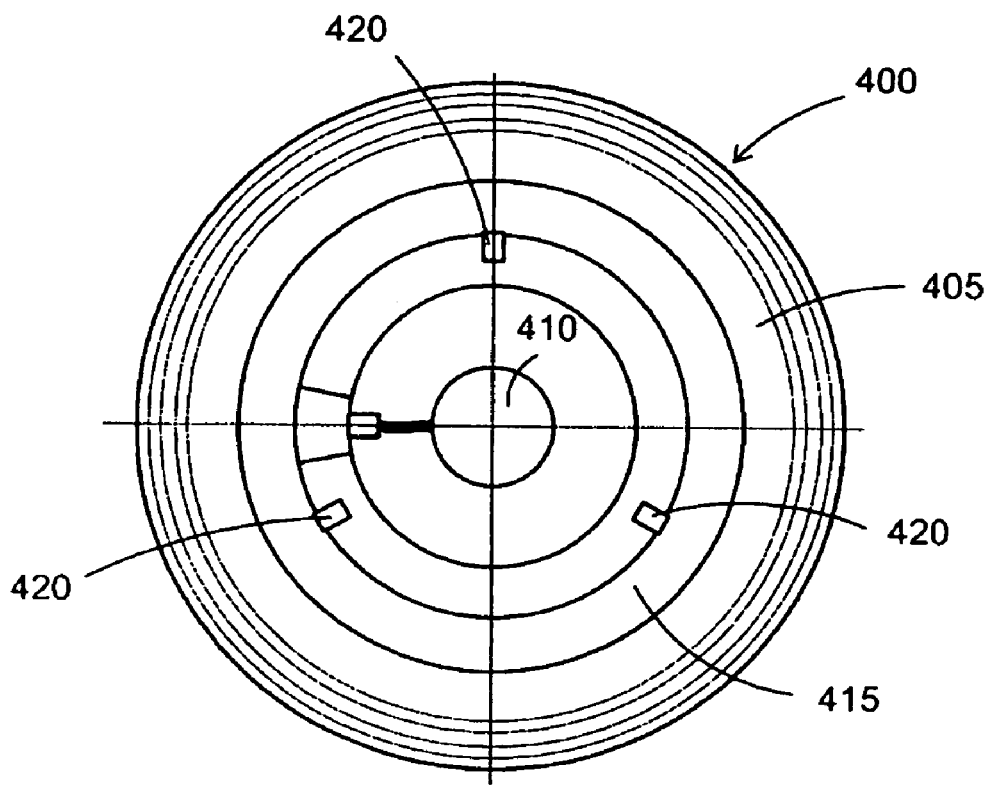
FIG. 10 is a top plan view of a conventional circular type fluorescent lamp mounted to a ceiling mountable lighting fixture.
Figure 11:
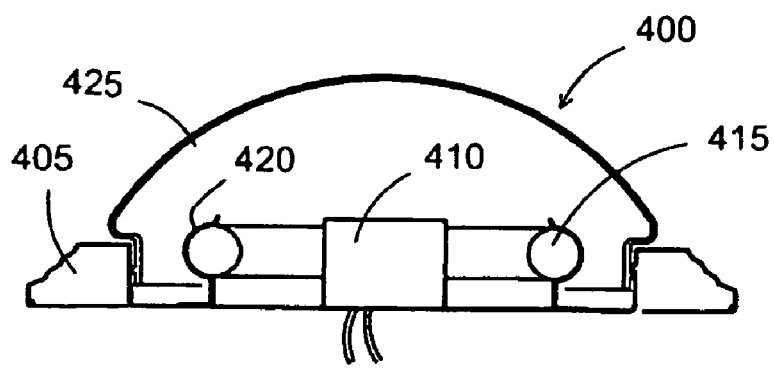
FIG. 11 is an elevational view, partly in cross-section, of the circular type fluorescent lamp and the lighting fixture of FIG. 10.
Figure 12:
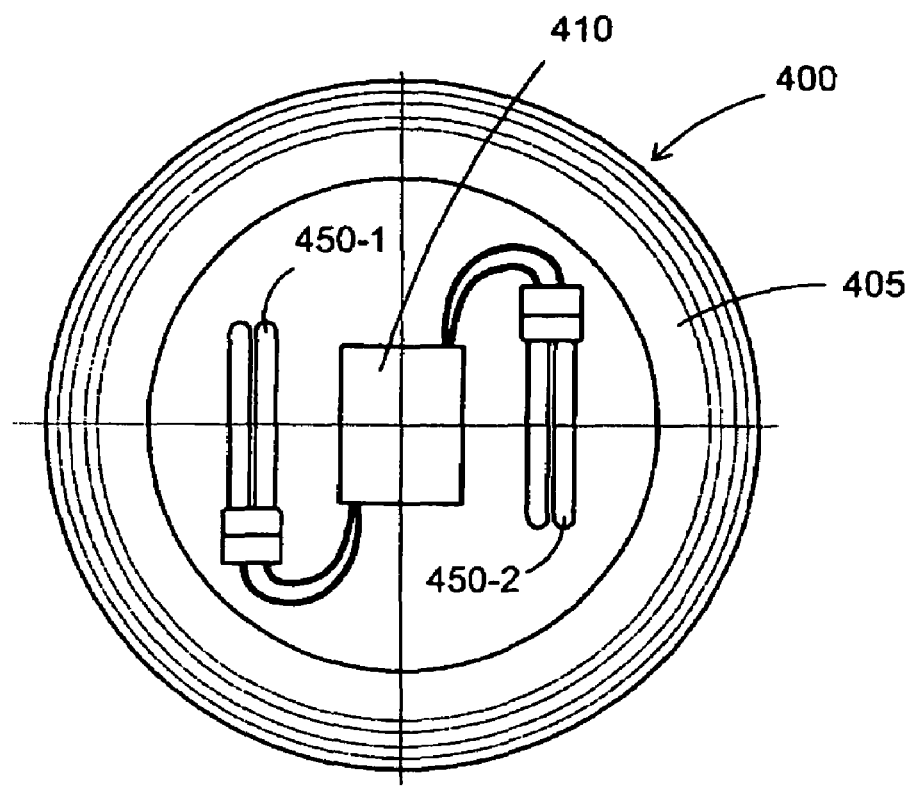
FIG. 12 is a top plan view of conventional fluorescent lamps having twin U-shaped lamp tubes or quad-straight lamp tubes mounted to a ceiling mountable lighting fixture.
Figure 13:
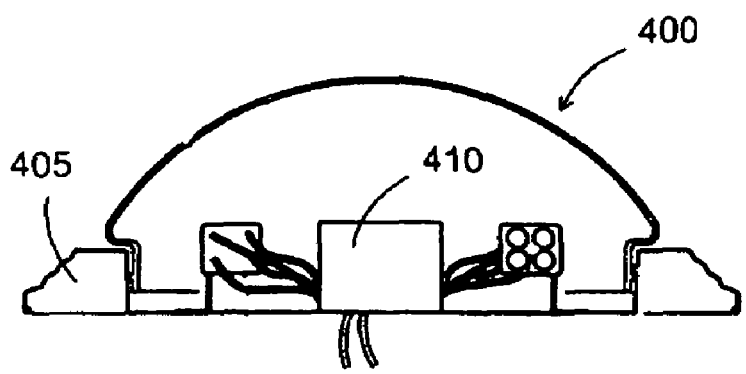
FIG. 13 is an elevational view, partly in cross-section, of the conventional fluorescent lamps and the lighting fixture of FIG. 12.

It should be noted that the embodiments of the fluorescent lamp unit described herein can be modified to employ other suitable types of lamp base arrangements, in addition to the screw-in type base 140 and direct wiring arrangement 320, 322. For example, FIG. 9A depicts another embodiment of the fluorescent lamp unit 370 which employs a bi-pin type base 376 having a pair of pins 378, 380 provided at the lower end thereof. FIG. 9B depicts a lighting fixture 390 for use with the fluorescent lamp unit 370 of FIG. 9A, which includes a fixture base 394 mountable to a ceiling or a wall of a room and a socket 396 coupled to the fixture base 394. The socket 396 is adapted to receive the bi-pin base 376 of the lamp unit 370. The light fixture 390 further includes a circular cover 392 removably attachable to the fixture base 394.

Embodiments of the fluorescent lamp unit 100, 300, 370 described herein provide a number of advantages over conventional fluorescent lamp units. For example, the fluorescent lamp unit 100, 300, 370 is operable for use with a ceiling mounted lighting fixture or other types of lighting fixtures having a limited height clearance in the region where a lamp unit to be mounted. Additionally, because the fluorescent lamp unit is self-ballasted (i.e., contains an electronic ballast within its housing), the lamp unit is convenient to install and replace.

Figure 14:
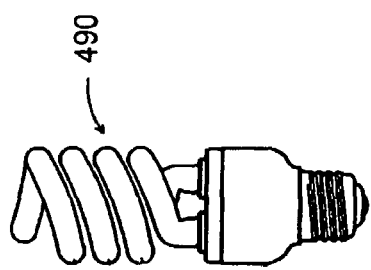
FIG. 14 is an elevational view of a conventional compact fluorescent lamp unit having a double spiral configuration.

Yet another advantage is that lamp unit 100, 300, 370 may be provide more evenly distributed lighting over the cover of a lighting fixture than conventional compact fluorescent lamps 490 shown in FIG. 14. As seen by referring to FIG. 14, the conventional compact fluorescent lamp 490 has a fluorescent tube formed in a double spiral configuration such that the spiral portions 492, 494 and 496 overlap each other. Accordingly, when such conventional compact fluorescent lamp 490 is mounted to a ceiling mounted lighting fixture, the lamp 490 may not be as effective in evenly distributing light over the cover of the ceiling mounted light fixture. Further, because of the overlapping of spiral portions 492, 494, 496, the conventional compact fluorescent lamp 490 shown in FIG. 14 may not be as effective in dissipating the heat generated by the fluorescent tube.

In comparison to the conventional compact fluorescent lamp, the spiral portions of the fluorescent lamp tube 105 has less vertical overlap, as seen by referring to FIGS. 1 and 7B. In particular, because the outer diameter of the double spiral configured tube 105 increases as the spiral portions 175, 180 extends from the upper central point 170 to sealed ends of the fluorescent tube, vertical overlapping of the spiral portions is significantly reduced. As such, the fluorescent lamp unit 100 may be capable of more effectively distributing light evenly over the cover of a lighting fixture and more effectively dissipating heat from the fluorescent lamp tube. It is noted that, while the embodiment of the lamp unit 100 illustrated in FIG. 7B shows almost no vertical overlap between the spiral portions, the fluorescent lamp tube 105 may be configured to have a defined amount of overlap between the spiral portions.

While the embodiments of the fluorescent lamp unit 100, 300, 370 are illustrated as being used with a ceiling mountable type lighting fixture, it is understood that the embodiments of the fluorescent lamp unit described herein may be used with other types of lighting fixtures, including wall mountable lighting fixtures and portable lighting units such as floor and table lamp units.

As noted above, in an alternative embodiment, the fluorescent lamp unit is provided with a non-standard Edison screw-in type conductive base (e.g., 21/32 inch intermediate-sized screw base). Accordingly, lighting fixtures, adapted for use with an alternative embodiment of the fluorescent lamp unit, are equipped with a corresponding lamp socket to accept the non-standard conductive base (e.g., intermediate-sized screw base). Because the lighting fixtures configured for use with the alternative embodiment of the fluorescent lamp unit will not be able to accept conventional incandescent bulbs with regular Edison screw-in type base, this will discourage consumers from replacing the fluorescent lamp unit with an incandescent lamp against the wishes of the federal government programs that are designed to conserve energy by increasing the use of fluorescent lamps. Another reason for discouraging consumers from replacing the fluorescent lamp unit with an incandescent lamp is that the lighting fixture may employ components (e.g., plastic components) that are not designed to withstand the heat generated by the incandescent lamps.

While the foregoing embodiments of the invention have been described and shown, it is understood that variations and modifications, such as those suggested and others within the spirit and scope of the invention, may occur to those skilled in the art to which the invention pertains. The scope of the present invention accordingly is to be defined as set forth in the appended claims.

What is claimed is:

1. A fluorescent lamp unit comprising:
a fluorescent tube having a double spiral configuration, the fluorescent tube having an upper central portion from which two spiral portions extend at a downward incline and wind around a vertical axis such that an outer diameter of the double spiral configured tube increases as the spiral portions extends from the upper central portion to sealed ends of the fluorescent tube;
a circuit assembly coupled to the fluorescent tube, the circuit assembly including a ballast circuit; and
a support member to support the fluorescent tube and the circuit assembly, the support member including a ballast housing to contain the ballast circuit.

2. The fluorescent lamp unit of claim 1, wherein the ballast housing is partially enclosed by the spiral portions of the fluorescent tube.

3. The fluorescent lamp unit of claim 1, wherein the ballast housing is non-detachably coupled to the fluorescent tube.

4. The fluorescent lamp unit of claim 1, wherein the ballast housing is defined by an upper wall and side walls, and the ballast housing extends vertically into a partially enclosed space region defined by the spiral portions of the fluorescent tube such that at least an upper half of the ballast housing is surrounded by the spiral portions of the fluorescent tube.

5. The fluorescent lamp unit of claim 1, wherein a downward inclination angle of the spiral portions of the fluorescent tube in a vicinity of the sealed ends is less than 25 degrees with respect to a horizontal axis, and the ballast housing has an upper surface disposed at an elevation above the sealed ends of the fluorescent tubes.

6. The fluorescent lamp unit of claim 1, wherein the support member further comprises:
a first tube holder section to receive one of the sealed ends of the fluorescent tube; and
a second tube holder section to receive another of the sealed ends of the fluorescent tube, wherein the first tube holder section and the second tube holder section are separated by a distance which is greater than a diameter of the ballast housing, and the ballast housing is disposed between the first tube holder section and the second tube holder section.

7. The fluorescent lamp unit of claim 6, wherein the support member further comprises a circular base structure having an upper plane section and a lower plane section, and the first tube holder section, the second tube holder section and the ballast housing are disposed on the upper plane section of the circular base structure.

8. The fluorescent lamp unit of claim 7, wherein the support member further comprises a neck section extending from the lower planar section of the base structure, and the fluorescent lamp unit further comprises an electrically conductive base attached to the neck section of the support member to mate with a lamp socket, the electrically conductive base coupled to the ballast circuit.

9. The fluorescent lamp unit of claim 1, further comprising a standard 34/32 inch medium screw base coupled to the circuit assembly.

10. The fluorescent lamp unit of claim 1, further comprising a 21/32 inch intermediate screw base coupled to the circuit assembly.

11. The fluorescent lamp unit of claim 1, further comprising a bi-pin type base coupled to the circuit assembly.

12. A fluorescent lamp unit for use with a ceiling mounted lighting fixture, comprising:

a fluorescent tube having a length greater than 60 centimeters is bent into a curved shaped configuration such that an overall outer diameter of the curved shaped fluorescent tube is in a range from 9 centimeters to 12 centimeters;

a ballast housing non-detachably coupled to the fluorescent tube to contain a ballast circuit; and a base electrically coupled to the ballast circuit, the base coupled to the ballast housing, wherein an overall vertical height of the ballast housing, the fluorescent tube and the base is less than 7 centimeters.

13. The fluorescent lamp unit of claim 12, wherein the fluorescent tube has a double spiral configuration, wherein the fluorescent tube has an upper central portion from which two spiral portions extend at a downward incline and wind around a vertical axis such that an outer diameter of the double spiral configuration increases as the spiral portions extends from the upper central portion to sealed ends of the fluorescent tube.

14. The fluorescent lamp unit of claim 12, wherein the ballast housing is partially enclosed by the fluorescent tube.

15. The fluorescent lamp unit of claim 12, further comprising:

a base support structure;

a first tube holder section coupled to the base support structure to hold one of ends of the fluorescent tube; and a second tube holder section coupled to the base structure to hold another of the ends of the fluorescent tube, wherein the ballast housing is coupled to the base structure between the first tube holder section and the second tube holder section.

16. The fluorescent lamp unit of claim 12, wherein the base is a standard $34/32$ inch medium screw-in type base.

17. The fluorescent lamp unit of claim 12, wherein the base is a $21/32$ inch intermediate screw-in type base.

18. The fluorescent lamp unit of claim 12, wherein the base is a bi-pin type base.

19. A fluorescent lamp unit comprising:

a housing support member including a ballast housing section to contain an electronic ballast therein, the ballast housing section defined by an upper wall and side walls; and at least one fluorescent tube coupled to the ballast, the at least one fluorescent tube non-detachably attached to the housing support member, wherein the at least one fluorescent tube configured such that the ballast housing section is partially surrounded by the at least one fluorescent tube, wherein the housing support member further comprises a base structure, a first tube holder section disposed on the base structure to hold one of ends of the fluorescent tube, and a second tube holder section disposed on the base structure to hold another of the ends of the fluorescent tube, wherein the ballast housing section is disposed on the base structure between the first tube holder section and the second tube holder section.

20. The fluorescent lamp unit of claim 19, wherein the ballast housing section is defined by an upper wall and side walls, and at least an upper half of the ballast housing is surrounded by the at least one fluorescent tube.

21. The fluorescent lamp unit of claim 19, wherein the fluorescent tube has a double spiral configuration, the fluorescent tube has an upper central portion from which two spiral portions extend at a downward incline and wind around a vertical axis such that an outer diameter of the double spiral configuration increases as the spiral portions extends from the upper central portion to sealed ends of the fluorescent tube, wherein an outer diameter of the double spiral configured fluorescent tube is greater than 10 centimeters.

22. The fluorescent lamp unit of claim 19, wherein the fluorescent tube has a length greater than 60 centimeters.

23. The fluorescent lamp unit of claim 19, further comprising:

an electrically conductive base coupled to the ballast, the electrical conductive base non-detachably attached to the support member to mate with a lamp socket, wherein an overall vertical height of the housing support member, the fluorescent tube and the conductive base is less than 7 centimeters.

* * * * *